(12) United States Patent
Kaufmann et al.

(10) Patent No.: US 10,430,952 B2
(45) Date of Patent: Oct. 1, 2019

(54) FOREGROUND-BACKGROUND DIFFERENTIATION IN A VEHICLE

(71) Applicant: Bayerische Motoren Werke Aktiengesellschaft, Munich (DE)

(72) Inventors: Matthias Roland Kaufmann, Unterschliessheim (DE); Vaibhav Kumar Mehta, Bremen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 85 days.

(21) Appl. No.: 15/618,351

(22) Filed: Jun. 9, 2017

(65) Prior Publication Data

US 2017/0278252 A1    Sep. 28, 2017

Related U.S. Application Data

(63) Continuation of application No. PCT/EP2015/078438, filed on Dec. 3, 2015.

(30) Foreign Application Priority Data

Dec. 15, 2014   (DE) .................. 10 2014 225 797

(51) Int. Cl.
| | |
|---|---|
| G06K 9/34 | (2006.01) |
| G06T 7/194 | (2017.01) |
| G06T 7/11 | (2017.01) |
| G06T 7/215 | (2017.01) |
| G06K 9/00 | (2006.01) |

(52) U.S. Cl.
CPC .......... *G06T 7/194* (2017.01); *G06K 9/00832* (2013.01); *G06T 7/11* (2017.01); *G06T 7/215* (2017.01); *G06T 2207/30268* (2013.01)

(58) Field of Classification Search
None
See application file for complete search history.

(56) References Cited

U.S. PATENT DOCUMENTS

2004/0001612 A1   1/2004  Gutta et al.

FOREIGN PATENT DOCUMENTS

| DE | 10 2009 017 135 A1 | 11/2010 |
|---|---|---|
| DE | 10 2012 023 060 A1 | 6/2014 |
| WO | WO 2007/050707 A2 | 5/2007 |

OTHER PUBLICATIONS

German-language Search Report issued in counterpart German Application No. 10 2014 225 797.2 dated Mar. 2, 2016 with partial English translation (11 pages).

(Continued)

*Primary Examiner* — Stephen P Coleman
(74) *Attorney, Agent, or Firm* — Crowell & Moring LLP (57) ABSTRACT

A method for segmenting a first scene from a sequence of scenes is described. In this case, the sequence of scenes was captured by a camera in or on a vehicle such as by smart-glasses. The method determines an optical flow of the first scene, on the basis of the sequence of scenes. In addition, the method determines statistical variables of the optical flow in different partial regions of the first scene. Furthermore, the method determines, on the basis of the statistical variables, a separating line between a foreground region and a background region of the first scene. In this case, determining the separating line includes determining, on the basis of the statistical variables, an indicator of whether the optical flow in the background region is attributable to a movement of the vehicle.

13 Claims, 3 Drawing Sheets

(56) References Cited

OTHER PUBLICATIONS

International Search Report (PCT/ISA/210) issued in PCT Application No. PCT/EP2015/078438 dated Mar. 15, 2016 with English translation (7 pages).
German-language Written Opinion (PCT/ISA/237) issued in PCT Application No. PCT/EP2015/078438 dated Mar. 15, 2016 (6 pages).
Giachetti et al., "The Use of Optical Flow for Road Navigation", IEEE Transactions on Robotics and Automation, Feb. 1998, pp. 34-48, vol. 14, No. 1, XP055252645.
Pless et al., "Evaluation of Local Models of Dynamic Backgrounds", Proceedings of the 2003 IEEE Computer Society Conference on Computer Vision and Pattern Recognition, 2003, pp. 1-6, XP010644590.
Sun et al., "On-Road Vehicle Detection: A Review", IEEE Transactions on Pattern Analysis and Machine Intelligence, May 2006, pp. 694-711, vol. 28, No. 5, XP008092043.
Jazayeri et al., "Vehicle Detection and Tracking in Car Video Based on Motion Model", IEEE Transactions on Intelligent Transportation Systems, Jun. 2011, pp. 583-595, vol. 12, No. 2, XP011325868.

FOREGROUND-BACKGROUND DIFFERENTIATION IN A VEHICLE

CROSS REFERENCE TO RELATED APPLICATIONS

This application is a continuation of PCT International Application No. PCT/EP2015/078438, filed Dec. 3, 2015, which claims priority under 35 U.S.C. § 119 from German Patent Application No. 10 2014 225 797.2, filed Dec. 15, 2014, the entire disclosures of which are herein expressly incorporated by reference.

BACKGROUND AND SUMMARY OF THE INVENTION

The invention relates to a method and a corresponding apparatus for segmenting images of a movable camera and for determining the pose of a movable camera.

Wearable apparatuses for augmenting the perception of reality of a user, such as, e.g. glasses with overlays with respect to the surroundings observed through the glasses, may also be used in a vehicle, for example to provide an occupant of the vehicle with more in-depth information with respect to traffic, more in-depth information with respect to the interior of the vehicle and/or warning notices. Here, where possible, information and/or notices which are connected to one or more objects in fact observed by the user of the apparatus should be output.

An apparatus for augmenting the perception of reality, e.g. smartglasses, typically includes a camera which captures surroundings observed by the user. The camera usually has a movable arrangement such that different surroundings observed by the user may be captured. By way of example, smartglasses typically have a camera which is able to capture surroundings of the smartglasses. This camera moves with the head of the user of the smartglasses.

In order to be able to uniquely position and identify an object in the observed surroundings of the user on the basis of image data captured by the camera, the pose of the camera, i.e. the position of the camera in 3-dimensional (3D) space and the orientation of the camera in 3D space, typically needs to be determined first. The pose of the camera may be determined on the basis of the detection of one or more known objects within the image data. More particularly, known features (e.g. feature points) or objects in the interior of a vehicle (e.g. a known CAD (computer-aided design) model of the interior of the vehicle) may be used to determine the pose of the camera.

The present document considers the technical problem of determining the pose of a movable camera in a vehicle with high accuracy. In this context, the present document considers, more particularly, the technical problem of precisely segmenting images captured by the movable camera into a foreground region and into a background region. The foreground region (which primarily comprises the interior of the vehicle) may then be used for determining the pose of the camera.

In accordance with one aspect of the invention, a method is described for segmenting a first scene (or a first image) from a sequence of scenes (or from a sequence of images). More particularly, the method is directed to subdividing the first scene into a foreground region and into a background region. In other words, pixels or image points of the first scene should be assigned either to a foreground region or to a background region. Here, the foreground region may primarily comprise the interior of a vehicle and the background region may primarily comprise exterior surroundings of the vehicle. In other words, the foreground region may comprise elements/objects (e.g. parts of the vehicle) which move with the vehicle. On the other hand, the background region may comprise elements/objects which do not move with the vehicle (e.g. exterior surroundings of the vehicle).

The sequence of scenes was captured by a camera (e.g. a mono camera or a stereo camera) of a vehicle, for example by a camera in or on a vehicle. The vehicle comprises e.g. a road vehicle, for example an automobile or a truck. The camera may be movably arranged in the interior of the vehicle and/or behind the windshield of a vehicle (e.g. of a motor bike). By way of example, the camera may be arranged on the head of a driver of the vehicle (e.g. on smartglasses worn by the driver of the vehicle). The camera may be configured to capture scenes or images which include both part of the interior of the vehicle (or part of the vehicle) and part of exterior surroundings of the vehicle. By way of example, the exterior surroundings of the vehicle may be captured through a window (e.g. through a windshield) of the vehicle. Therefore, the first scene may comprise an interior portion, in which an interior of the vehicle and/or parts of the vehicle are displayed and an exterior portion, in which external surroundings of the vehicle are displayed.

The method includes determining an optical flow, more particularly optical flow vectors, of the first scene on the basis of the sequence of scenes. Here the optical flow, more particularly the optical flow vectors, of the first scene can be determined for a multiplicity of features (or for a multiplicity of prominent image points) of the first scene. More particularly, the optical flow, more particularly the flow vectors, may be determined for so-called ORB (Oriented FAST and Rotated BRIEF) features. Here, the optical flow, more particularly the optical flow vectors, of the first scene may be determined in an efficient and robust manner by use of a hierarchic procedure, for example by use of the hierarchic Lucas-Kanade method. By way of example, the optical flow, more particularly the optical flow vectors, of the first scene may be determined in a hierarchic fashion for different resolutions of the multiplicity of features. Here, the resolution of the multiplicity of features may be successively increased.

The method further comprises determining statistical variables of the optical flow, i.e., more particularly, of the optical flow vectors, in different portions of the first scene. The statistical variable of optical flow vectors in a portion may e.g. comprise a mean magnitude or a mean size/strength of the optical flow vectors in the portion. In an alternative or complementary manner, the statistical variable may comprise a measure of homogeneity (e.g. a variance or a standard deviation) of the optical flow vectors in the portion. By way of example, the portions may correspond to a preliminary or final background region and foreground region of the first scene.

Moreover, the method comprises determining a separating line between a foreground region and a background region of the first scene on the basis of the statistical variables and, optionally, on the basis of the different portions. In other words, the curve of a separating line which subdivides the first scene into a foreground region and into a background region may be determined on the basis of the statistical variables. Here, determining the separating line comprises determining, on the basis of the statistical variable, an indicator that, whether, to what extent and/or how far the optical flow, i.e., more particularly, the optical flow vectors, in the background region can be traced back to a movement of the vehicle.

Hence, on the basis of analyzing the optical flow (i.e., more particularly, the flow vectors) and on the basis of the fact that some of the flow vectors (i.e., more particularly, the flow vectors which may be traced back to features in the external portion of the first scene) are caused by the movement of the vehicle, the method facilitates an efficient and robust segmentation of the scene into a foreground region and into a background region. By way of example, this segmentation may be used to precisely determine the pose of the e.g. movable camera in the vehicle interior.

The indicator that, whether, to what extent and/or how far the optical flow, i.e., in particular, the flow vectors, in the background region can be traced back to a movement of the vehicle may comprise a measure of distance which indicates a distance of a statistical variable of the optical flow vectors in the foreground region from a corresponding statistical variable of the optical flow vectors in the background region. By way of example, the separating line may be determined in such a way that the measure of distance is increased (possibly maximized). The use of a measure of distance as an indicator for whether the flow vectors in the background region can be traced back to a movement of the vehicle is based on the observation that the statistical behavior of the flow vectors in the interior of the vehicle or at parts of the vehicle deviates significantly from the statistical behavior of the flow vectors in the exterior surroundings of the vehicle. By classifying the flow vectors and the corresponding image points depending on the measure of distance, it is possible to bring about a robust and precise division of the first scene into a foreground region and into a background region.

The measure of difference may comprise a difference between the corresponding statistical variables. By way of example, the measure of distance may comprise a difference between the mean magnitude of the optical flow vectors in the (possibly preliminary) foreground region and the mean magnitude of the optical flow vectors in the (possibly preliminary) background region. This measure of distance exploits the fact that, in the case of the vehicle driving, the flow vectors in the exterior portion of the first scene typically have a greater magnitude than in the interior portion. Hence, the measure of distance (in particular, a value of the measure of distance) is an indicator that or whether or to what extent the flow vectors of the (possibly preliminary) background region can be traced back to a movement of the vehicle.

Alternatively, or in a complementary manner, the measure of distance may comprise a difference between the measure of homogeneity of the optical flow vectors in the (possibly preliminary) foreground region and the measure of homogeneity of the optical flow vectors in the (possibly preliminary) background region. This measure of distance exploits the fact that, when the vehicle is driving, the flow vectors in the external portion of the first scene are typically substantially less homogeneous than in the interior portion. Hence, the measure of distance (in particular, a value of the measure of distance) is an indicator that or whether or to what extent the flow vectors of the (possibly preliminary) background region can be traced back to a movement of the vehicle.

The measure of distance may e.g. comprise a combination (e.g. a weighted sum) of the aforementioned differences. The accuracy and robustness of a segmentation may be further improved by such a combination.

The method may comprise determining a preliminary curve of the separating line. On the basis of the preliminary curve of the separating line, the first scene may be subdivided into a preliminary foreground region and into a preliminary background region. Then, it is possible to determine a statistical variable of the optical flow vectors in the preliminary foreground region and a corresponding statistical variable of the optical flow vectors in the preliminary background region. Moreover, it is possible to determine a value of the indicator on the basis of the determined statistical variables for the preliminary foreground region and for the preliminary background region. The curve of the separating line may then be fitted in such a way that the value of the indicator is improved (possibly optimized, i.e. maximized or minimized). The (final) separating line between the (final) foreground region and the (final) background region may, in particular, be determined in iterative fashion (by repeating the aforementioned steps). Here, the indicator may be used as an optimization criterion and a value of the indicator (i.e. a value of the optimization criterion) may be improved (possibly optimized) by the iterations. Hence, there may be a robust segmentation of the first scene.

One or more conditions with respect to the separating line may be taken into account when determining the separating line. The efficiency and the robustness of the method may be increased by conditions. The conditions allow the fact that a separation between windows (i.e. the external portion of the first scene) and interior (i.e. internal portion of the first scene) typically extends horizontally in vehicles to be taken into account. By way of example, the separating line may be determined in such a way that the separating line has exactly one point on a vertical axis of the first scene for each point on a horizontal axis of the first scene. In other words, the separating line may be determined in such a way that the separating line assumes exactly one value on the vertical axis for each value on the horizontal axis. Furthermore, the separating line may be determined in such a way that the value of a mean gradient of the separating line along the horizontal axis is less than or equal to a predefined gradient threshold. By way of example, the gradient threshold may lie at zero. Thus, it is possible to determine a separating line which, on average, extends horizontally through the first scene. Secondly, when determining the separating line, it is possible to stipulate that the separating line extends horizontally through the first scene in the entire region. Moreover, it is possible to stipulate that the curve of the separating line is continuous, at least in portions.

The method may further comprise determining a driving speed of the vehicle. The indicator that, whether, to what extent and/or how far the flow vectors in the background region can be traced back to a movement of the vehicle may be determined depending on the driving speed of the vehicle. By way of example, a weighting between the measure of distance in respect of the mean magnitude and the measure of distance in respect of the measure of homogeneity may be changed in a combined indicator depending on the driving speed of the vehicle. In particular, the weighting may be shifted to the measure of distance in relation to the measure of homogeneity as the driving speed reduces (and vice versa). By taking into account the driving speed during the segmentation, it is possible to further increase the accuracy and robustness of the segmentation.

The separating line may be determined in such a way that the foreground region has a smaller external proportion than the background region. Here, the external proportion may indicate the proportion of a region of the first scene which corresponds to the external portion of the first scene. Alternatively, or in a complementary manner, the external proportion may indicate the proportion of flow vectors which can be traced back to movement of the vehicle.

In accordance with a further aspect, a method for determining a pose of a camera is described. Here, the camera is movably arranged in the interior of a vehicle or at the vehicle (e.g. in smartglasses of the driver of the vehicle). In particular, the camera may be arranged in such a way that a scene captured by the camera comprises parts of the vehicle and parts of the surroundings of the vehicle.

The method comprises capturing a sequence of scenes by use of the camera. Moreover, the method comprises determining a foreground region of a first scene from the sequence of scenes. Here, the foreground region may be determined in accordance with the method described in this document for segmenting a scene. Moreover, the method comprises detecting one or more reference points in the foreground region of the first scene and determining the pose of the camera on the basis of the reference point or reference points detected. By restricting the search of one or more reference points to the foreground region, it is possible to increase the accuracy of the determined pose.

In accordance with one aspect, a control unit configured to carry out one or more of the methods described in this document is described. By way of example, this may be the control unit of an apparatus for augmenting the perception of reality (e.g. smartglasses). Here, the control unit may be configured to determine whether the apparatus for augmenting the perception of reality is situated in a vehicle. If this is the case, it is possible to carry out one of the methods described in this document.

In accordance with a further aspect, an apparatus for augmenting the perception of reality (e.g. smartglasses) comprising the control unit described in this document is described.

In accordance with a further aspect, a vehicle (e.g. an automobile, a truck or a motorbike) comprising the control unit described in this document is described.

In accordance with a further aspect, a software (SW) program is described. The SW program may be configured to be run on a processor (e.g. on a control appliance) in order thereby to carry out the method described in this document.

In accordance with a further aspect, a storage medium is described. The storage medium may comprise a SW program configured to be run on a processor in order thereby to carry out the method described in this document.

It should be noted that the methods, apparatuses and systems described in this document may be used both on their own and in combination with other methods, apparatuses and systems described in this document. Moreover, all aspects of the methods, apparatus and systems described in this document may be combined with one another in multifaceted ways.

Other objects, advantages and novel features of the present invention will become apparent from the following detailed description of one or more preferred embodiments when considered in conjunction with the accompanying drawings.

DETAILED DESCRIPTION OF THE DRAWINGS

As presented at the outset, the present document concerns determining the pose of a camera of an apparatus for augmenting the perception of reality of a user. In this context, the present document concerns, in particular, the segmentation of images captured by the camera.

Figure 1A:
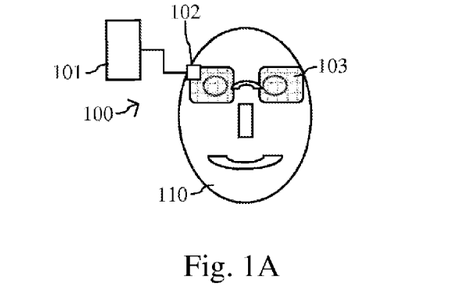
FIG. 1A is a schematic diagram of a front view of an exemplary embodiment for augmenting the perception of reality in a vehicle.

FIG. 1A shows an exemplary apparatus 100 for augmenting the perception of reality (augmented reality) in a front view. In particular, FIG. 1A shows smartglasses 100, which are worn by a user 110. The smartglasses 100 include a camera 102, which is typically affixed to the smartglasses 100 and which moves with the head of the user 110. The camera 102 may be a mono camera or a stereo camera. The camera 102 is configured to capture image data (for example a temporal sequence of images or scenes) of surroundings of the smartglasses 100. In particular, it is possible to capture image data of the surroundings observed by the user 110.

The image data may be processed by a control unit 101 of the smartglasses 100. In particular, the control unit 101 may be configured to detect and identify one or more objects in the captured surroundings on the basis of the image data. Furthermore, the control unit 101 may be configured to determine an information item with respect to the identified one or more objects (e.g. the street name of an identified street). Moreover, the control unit 101 may be configured to output the determined information item on an output unit 103 of the smartglasses 100 (e.g. on a transparent screen in the spectacle lenses of the smartglasses 100). Hence, the user 110 may be provided with more in-depth information items with respect to the surroundings perceived by the user 110.

Figure 1B:
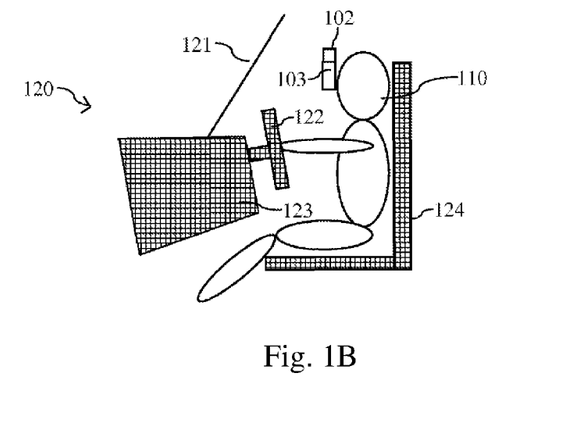
FIG. 1B is a schematic diagram of a side view of an exemplary embodiment for augmenting the perception of reality in a vehicle.

FIG. 1B shows a side view of the user 110 with the apparatus 100 for augmenting the perception of reality. The user 110 is situated in a vehicle 120. In particular, the user 110 sits on a driver's seat 124 and holds a steering wheel 122 of the vehicle 120 in his hands. Moreover, the user 110 observes the front surroundings of the vehicle 120 through the smartglasses 100 and through the windshield 121 of the vehicle 120. Moreover, FIG. 1B shows an instrument panel 123 of the vehicle 120.

For being able to reliably detect and, in particular, identify an object within a captured image, it is advantageous if the pose of the camera 102 of the smartglasses 100 is known. Here, the pose typically comprises the position of the camera 102 and the orientation of the camera 102, i.e. the pose typically comprises 6 degrees of freedom. The pose of the camera 102 may change by virtue of the user 110 changing the position of his head and/or the orientation of his head (e.g. the direction of view).

By way of example, the pose of the camera 102 may be determined by one or more suitable sensors. Exemplary sensors include a gyro sensor, an acceleration sensor and/or a magnetometer. However, such sensors increase the cost of an apparatus 100 for augmenting the perception of reality. In order to avoid additional costs, it is desirable to determine the pose of the camera 102 on the basis of the image data captured by the camera 102. To this end, one or more known reference points may be defined in the interior of the vehicle 120 or on the vehicle 120. By way of example, it is possible to take into account a CAD (computer-aided design) model of the interior of the vehicle 120. Then, the image data may be analyzed in order to detect the one or more predefined reference points in the image data. Since the positioning of the reference points in relation to one another is known, the pose of the camera 102 may be determined in this way.

Typically, the image data captured by the camera 102 comprise a multiplicity of captured objects or a multiplicity of features. The one or more known reference points for determining the pose must be determined from the multiplicity of captured objects/features. This may lead to a relatively high number of false detections of reference points and hence to a relatively inaccurate determination of the pose of the camera 102 in the case of a large number of captured objects/features. Moreover, this causes a relatively high computational outlay, energy outlay and/or time outlay. In order to increase the quality of determining the pose and/or in order to reduce the outlay for determining the pose, it is therefore advantageous to reduce the number of captured objects/features which come into question as reference points.

To this end, an image captured by the camera 102 or a captured scene may be subdivided into a foreground region and into a background region. Here, the foreground region comprises the region of a captured scene in which the one or more reference points may be situated (e.g. an interior of the vehicle or part of the vehicle). By contrast, the background region comprises the region in which no reference points are to be expected (e.g. exterior surroundings of the vehicle).

For the purposes of using an apparatus 100 for augmenting the perception of reality in a vehicle 120, the reference points are typically defined in the known interior of the vehicle 120 and/or on a visible part of the vehicle. By way of example, the reference points may be situated on the steering wheel 122 and/or on the instrument panel 123 of the vehicle 120. Here, non-movable reference points (e.g. on the instrument panel 123) are typically advantageous when compared with movable reference points (e.g. on the steering wheel 122). In the vehicle 120, the interior of the vehicle 120 therefore represents the foreground region. On the other hand, surroundings of the vehicle 120 observed through a pane 121 of the vehicle 120 typically constitute a background region of the captured scene.

Figure 2:
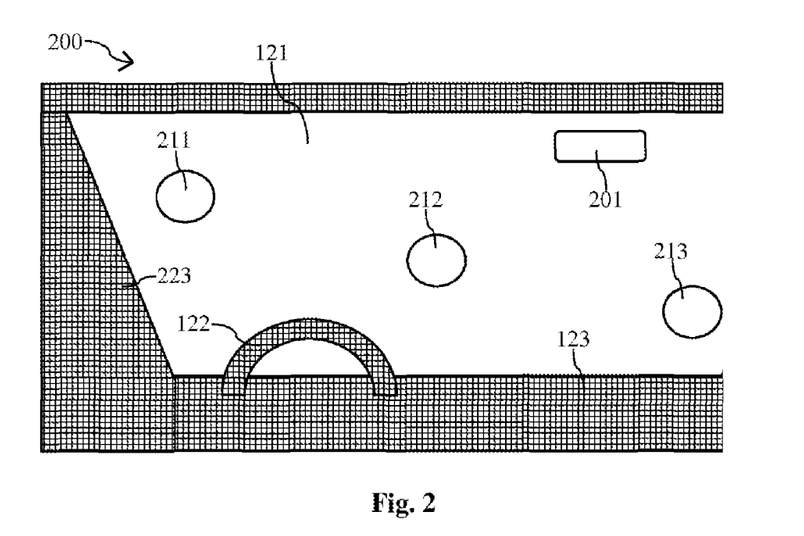
FIG. 2 shows an exemplary scene which was captured by a camera of the apparatus for augmenting the perception of reality.

The control unit 101 may be configured to segment a captured scene into a foreground region and into a background region on the basis of the image data (which typically comprise a temporal sequence of captured scenes). FIG. 2 shows an exemplary scene 200 which was captured by, e.g., the camera 102 of smartglasses 100 of the driver 110 who is driving. The scene 200 comprises regions situated in the interior of the vehicle 120. By way of example, the scene 200 comprises a region in which the steering wheel 122 is depicted, a region in which the control panel 123 is depicted and a region in which a side 223 (e.g. a door) of the vehicle 120 is depicted. Moreover, the scene 200 comprises a region in which exterior surroundings of the vehicle 120 are depicted. This region typically corresponds to the region of the windshield 121 of the vehicle 120. FIG. 2 shows exemplary objects 211, 212, 213 in the surroundings of the vehicle 120. By way of example, the first object 211 represents a house at the edge of the road on which the vehicle 120 is driving, the second object 212 represents another vehicle driving in front of the vehicle 120 and the third object 213 represents another vehicle which is parked on the right edge of the road. Moreover, FIG. 2 shows a rear-view mirror 201 of the vehicle 120.

Figure 3:
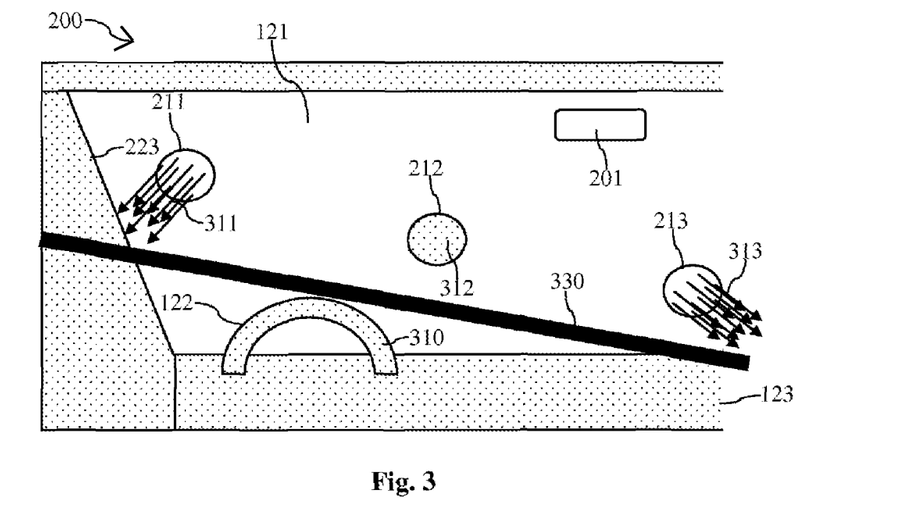
FIG. 3 shows exemplary optical flow vectors of a sequence of captured scenes.

As may be identified from FIG. 2, it is typical for vehicle 120 that the background of a scene 200 (which e.g. corresponds to the region of the windshield 121) is separated from the foreground of the scene 200 by a clear separating line. This applies, in particular, to vehicles 120 which have a passenger cabin which separates an occupant from the surroundings of the vehicle. In such vehicles, the background is usually above and the foreground is usually below this clear separating line. The separating line may be a straight line (as depicted in FIG. 3) or the separating line may have the form of a curve. Here, the separating line subdivides a scene into a region tending to be at the top (which represents the background of the scene 200) and a region which tends to be at the bottom (which represents the foreground of the scene 200).

FIG. 3 shows an exemplary separating line 330 which subdivides the scene 200 into a lower region (foreground) and into an upper region (background). Here, the separating line 330 may be determined on the basis of the optical flow of features (i.e. prominent features) in the scene 200. By way of example, the optical flow (in particular flow vectors of features of a scene 200) may be determined on the basis of the Lucas-Kanade method. Here, the optical flow may initially be determined for a reduced resolution of the scene 200. This optical flow may then be used as an initial point for calculating the optical flow for a higher resolution, etc., until, finally, the optical flow is determined for the full resolution of the scene 200. Hence, the optical flow may be determined in hierarchic fashion.

When determining the optical flow, the movement of an identified feature (in particular of a so-called ORB, Oriented FAST and Rotated BRIEF feature) between at least two scenes 200 captured successively in time may be observed. In particular, this allows determining how strongly and to where an identified feature has moved. In other words, a flow vector (with magnitude and direction) may be determined for an identified feature, said flow vector indicating how the identified feature has moved.

FIG. 3 shows exemplary flow vectors 310, 311, 312, 313 for features in the interior of the vehicle 120 and for features in the exterior surroundings of the vehicle 120. In particular, FIG. 3 shows a typical situation in which the vehicle 120 is driving and in which the driver has fixated his gaze on the forward surroundings of the vehicle 120.

An edge of the steering wheel 122 may be considered as a feature in the interior of the vehicle 120 in an exemplary manner. The punctiform flow vectors 310 indicate that this feature in the interior has not moved (in successive scenes 200). In particular, this is due to the driver of the vehicle 120 not having moved his head (and hence not having moved the camera 102).

By way of example, the objects 211, 212, 213 (in particular the edges thereof) may be considered to be features in the exterior surroundings of the vehicle 120. As may be seen from FIG. 3, the first object 211 (e.g. a house at the edge of the road) and the third object 213 (e.g. a vehicle parked at the edge of the road) have relatively high optical flows 311, 313. On the other hand, the second object 212 (e.g. another vehicle driving in front of the vehicle 120) has a relatively low optical flow 312.

In particular, the following observations may be made:

(a) The optical flow 311, 312, 313 of features 211, 212, 213 in the exterior surroundings of the vehicle 120 is typically greater in magnitude than the optical flow 310 of features 122, 123, 223 in the interior of the vehicle 120.

(b) The flow vectors 311, 312, 313 of features 211, 212, 213 in the exterior surroundings of the vehicle 120 typically have a greater variance than the flow vectors 310 of features 122, 123, 223 in the interior of the vehicle 120.

It is possible to set one or more conditions which may be used to determine the separating line 330 between the background and the foreground on the basis of such observations. In particular, it is possible to determine cost functions or indicators which may be optimized in order to determine the separating line 330.

By way of example, the separating line 330 may be determined in such a way that a difference between a mean magnitude of the flow vectors 311, 312, 313 in the background region of the scene 200 and a mean magnitude of the flow vectors 310 in the foreground region of the scene 200 is increased (possibly maximized).

Alternatively, or in a complementary manner, the separating line 330 may be determined in such a way that a difference between a measure of homogeneity of the flow vectors 311, 312, 313 in the background region of the scene 200 and a measure of homogeneity of the flow vectors 310 in the foreground region of the scene 200 is increased (possibly maximized). By way of example, the measure of homogeneity may comprise the variance of the directions and/or the magnitudes of the flow vectors in a respective portion of the scene 200.

The aforementioned conditions may also be combined. By way of example, a separating line 330 may be determined in such a way that the weighted sum of the difference of the magnitudes and the difference of the measures of homogeneity is increased (possibly maximized).

Figure 4:
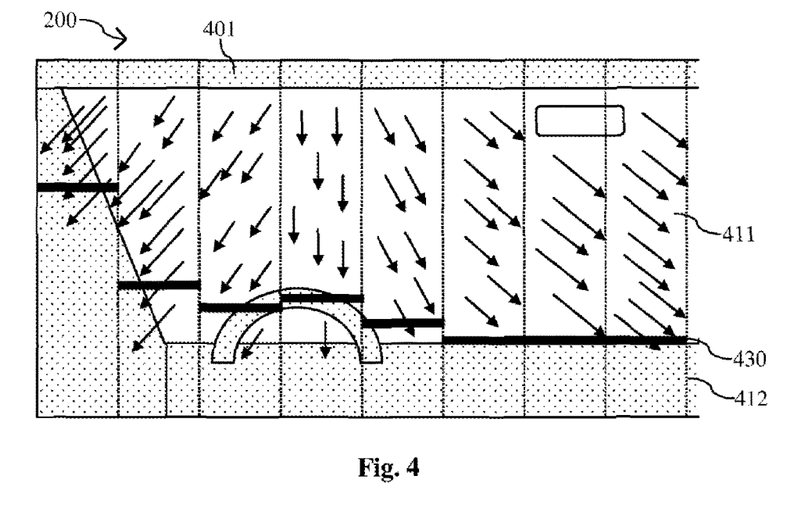
FIG. 4 shows an exemplary separating line between a foreground region and a background region.

FIG. 4 shows an exemplary subdivision of the scene 200 into a background region 411 and into a foreground region 412. By way of example, the scene 200 may be subdivided into columns 401 and a separating line segment 430 may be determined for each column 401 (on the basis of the aforementioned conditions). Then, the separating line 330 may be determined on the basis of the separating line segments 430, said separating line separating the scene 200 into a background region 411 and into a foreground region 412. By way of example, the separating line segments 430 may be strung together and/or interpolated in order to determine the separating line 330.

After the foreground region 412 has been determined, the search for the reference points for determining the pose of the camera 102 may be restricted to the foreground region 412. This may substantially increase the probability of the reference points being detected correctly. This in turn increases the accuracy when determining the pose of the camera 102 (and hence the accuracy of identifying objects (such as e.g. streets) in the scene 200 for the provision of more in-depth information items).

Figure 5:
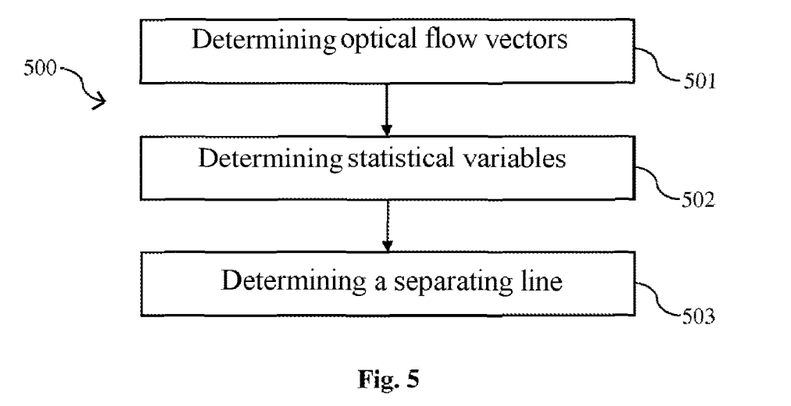
FIG. 5 is a flowchart of an exemplary method for foreground/background segmentation of a captured scene.

FIG. 5 shows a flowchart of an exemplary method 500 for segmenting a first scene 200 from a sequence of scenes 200. Here, the sequence of scenes 200 has been captured by a (typically movable) camera 102 in a vehicle 120 (in particular, in the interior of the vehicle 120). The method 500 comprises determining 501 an optical flow (in particular optical flow vectors) 310, 311, 312, 313 of the first scene 200 on the basis of the sequence of scenes 200. Moreover, the method 500 comprises determining 502 statistical variables of the optical flow (in particular, of the optical flow vectors) 310, 311, 312, 313 in different portions of the first scene 200. In addition, the method 500 comprises determining 503 a separating line 330 between a foreground region 412 and a background region 411 of the first scene 200 on the basis of the statistical variables. Here, determining 503 the separating line 330 comprises determining, on the basis of the statistical variables, an indicator for whether the optical flow (i.e., in particular, the optical flow vectors) in the background region 411 can be traced back to movement of the vehicle 120.

The described method uses the inherent movement of the vehicle 120 in order to determine a robust separating line 330 between foreground region 412 and background region 411. The flow vectors determined in the process may be reused in subsequent processing steps. By way of example, the inherent movement of the camera 102 may be determined on the basis of the flow vectors in the foreground region 412. Moreover, the described method has relatively low computational requirements (in particular when using a hierarchic method for determining the flow vectors). Moreover, the described method allows the pose of a movable camera 102 in the vehicle 120 to be determined with a high accuracy (in particular when using a model of the interior of the vehicle 120).

As presented in this document, features (e.g. ORB features) are typically determined for calculating the optical flow for identifying the separating line 330 between foreground and background. Feature points (e.g. ORB features) are typically required again for the subsequent determination of the pose of the camera 102 (i.e. following the foreground-background segmentation), and so the feature points (e.g. ORB features) determined once may be reused. Hence, overall, computational time may be saved. Moreover, these features are known in various resolutions when the separating line 330 is determined in hierarchic fashion, and so the pose may also be determined in hierarchic fashion without great additional outlay. In particular, the pose may be determined in a first step by an image with a relatively low resolution (by means of the ORB features determined to this end). Subsequently, further degrees of detail of the pose may be determined (by means of the ORB features with a higher resolution) depending on the use case, time and/or criticality.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a pose of a camera movably arranged in or on a vehicle the method comprising the acts of:
    capturing, by the camera, a sequence of scenes, including a first scene;
    determining, by a processor coupled to the camera, a foreground region of the first scene from the sequence of scenes by
        determining an optical flow of the first scene on the basis of the sequence of scenes,
        determining statistical variables of the optical flow in different portions of the first scene,
        determining, on the basis of the statistical variables, a separating line between a foreground region and a background region of the first scene, wherein determining the separating line comprises determining, on the basis of statistical variables, an indicator for whether the optical flow in the background region is attributable to a movement of the vehicle;
    detecting, by the processor, a reference point in the foreground region of the first scene; and
    determining, by the processor, a pose of the camera on the basis of the detected reference point.

2. The method as claimed in claim 1, wherein the method further comprises the acts of:
    determining a preliminary curve of the separating line;
    subdividing the first scene into a preliminary foreground region and into a preliminary background region on the basis of the preliminary curve of the separating line;
    determining a statistical variable of the optical flow in the preliminary foreground region and determining a corresponding statistical variable of the optical flow in the preliminary background region;
    determining a value of the indicator on the basis of the determined statistical variables for the preliminary foreground region and for the preliminary background region; and
    adapting the curve of the separating line such that the value of the indicator is improved.

3. The method as claimed in claim 1, wherein the separating line is determined such that:
    (i) the separating line has precisely one point on a vertical axis of the first scene for each point on a horizontal axis of the first scene;
    (ii) the magnitude of a mean gradient of the separating line along the horizontal axis is less than or equal to a predetermined gradient threshold;
    (iii) the separating line extends horizontally through the first scene; and/or
    (iv) the curve of the separating line is continuous, at least in sections.

4. The method as claimed in claim 1, wherein the method comprises determining a driving speed of the vehicle, and
    the indicator for whether the optical flow in the background region is attributable to movement of the vehicle is determined depending on the driving speed of the vehicle.

5. The method as claimed in claim 1, wherein:
    the first scene comprises an inner portion in which an interior of the vehicle is depicted and comprises an outer portion in which exterior surroundings of the vehicle are depicted; and/or
    the separating line is determined such that the foreground region has a smaller outer proportion than the background region; and wherein
        the outer proportion indicates the proportion of the region of the first scene which corresponds to the outer portion of the first scene; and/or
        the outer proportion indicates the proportion of flow vectors which are attributable to a movement of the vehicle.

6. The method of claim 1, where the pose comprises a position of the camera in 3D space and an orientation of the camera in 3D space.

7. The method as claimed in claim 1, wherein:
    the optical flow of the first scene is determined for a multiplicity of features of the first scene;
    the optical flow of the first scene is determined in hierarchic fashion for different resolutions of the multiplicity of features; and/or
    the optical flow of the first scene is determined by the hierarchic Lucas-Kanade method.

8. The method as claimed in claim 7, wherein the multiplicity of features are ORB features.

9. The method as claimed in claim 1, wherein the optical flow comprises optical flow vectors.

10. The method as claimed in claim 9, wherein the statistical variable of the optical flow vectors in a portion comprises one or more of:
    (i) a mean magnitude of the optical flow vectors in the portion; and/or
    (ii) a measure of homogeneity of the optical flow vectors in the portion.

11. The method as claimed in claim 9, wherein
    the indicator for whether the optical flow in the background region is traceable back to the movement of the vehicle comprises a measure of distance indicating a distance of a statistical variable of optical flow vectors in the foreground region from a corresponding statistic variable of optical flow vectors in the background region.

12. The method as claimed in claim 11, wherein the measure of distance comprises a difference of the corresponding statistical variables.

13. The method as claimed in claim 11, wherein the measure of distance comprises:
    (i) a difference between a mean magnitude of the optical flow vectors in the foreground region and a mean magnitude of the optical flow vectors in the background region; and/or
    (ii) a difference between a measure of homogeneity of the optical flow vectors in the foreground region and a measure of homogeneity of the optical flow vectors in the background region.

* * * * *